United States Patent
Bullemer et al.

(10) Patent No.: US 8,269,620 B2
(45) Date of Patent: Sep. 18, 2012

(54) ALARM TREND SUMMARY DISPLAY SYSTEM AND METHOD

(75) Inventors: Peter Bullemer, Independence, MN (US); Dal Vernon C. Reising, Canton, MI (US); Mischa Tolsma, Secunda (ZA)

(73) Assignee: Honeywell Internatonal Inc., Morristown, NJ (US)

( * ) Notice: Subject to any disclaimer, the term of this patent is extended or adjusted under 35 U.S.C. 154(b) by 440 days.

(21) Appl. No.: 12/339,912

(22) Filed: Dec. 19, 2008

(65) Prior Publication Data

US 2010/0156654 A1  Jun. 24, 2010

(51) Int. Cl.
*G08B 29/00* (2006.01)
(52) U.S. Cl. ........ 340/506; 340/507; 340/508; 340/509; 340/510; 340/679; 340/680; 340/681; 340/682; 340/683; 700/83; 700/110; 715/771; 715/772
(58) Field of Classification Search .................. 340/691, 340/506–513, 679–683; 345/736, 440–440.2; 700/83, 110; 715/771–772
See application file for complete search history.

(56) References Cited

U.S. PATENT DOCUMENTS

| | | | |
|---|---|---|---|
| 5,287,390 A | 2/1994 | Scarola et al. | |
| 5,353,315 A | 10/1994 | Scarola et al. | |
| 5,581,242 A | 12/1996 | Arita et al. | |
| 5,617,311 A | 4/1997 | Easter et al. | |
| 5,768,119 A | 6/1998 | Havekost et al. | |
| 5,892,440 A | 4/1999 | Bryan | |
| 6,356,282 B2 | 3/2002 | Roytman et al. | |
| 6,437,812 B1 | 8/2002 | Giles et al. | |
| 6,690,274 B1 | 2/2004 | Bristol | |
| 6,774,786 B1 | 8/2004 | Havekost et al. | |
| 7,000,193 B1 | 2/2006 | Impink, Jr. et al. | |
| 7,250,856 B2 | 7/2007 | Havekost et al. | |
| 2001/0019328 A1* | 9/2001 | Schwuttke et al. | 345/440 |
| 2002/0012011 A1* | 1/2002 | Roytman et al. | 345/736 |

(Continued)

FOREIGN PATENT DOCUMENTS

EP  0 959 398 A1  11/1999

(Continued)

OTHER PUBLICATIONS

Bristol, E. H., "Improved process control alarm operation," *ISA Transactions* (2001) 40:191-205.

(Continued)

*Primary Examiner* — George Bugg
*Assistant Examiner* — Ojiako Nwugo
(74) *Attorney, Agent, or Firm* — Luis M. Ortiz; Kermit D. Lopez; Melissa Asfahani

(57) ABSTRACT

An alarm trend summary display system and method can utilize an alarm trend list that works together with an alarm summary list. A set of rows in the alarm trend list can be organized in a top-to-bottom manner. A set of alarm indicators within each row in the alarm trend list can be arranged in a right-to-left horizontal arrangement. The set of alarm indicators can be aligned with most recent alarms appearing on a right side of the alarm trend list. The specific alarm indicators can be selected in the alarm trend list, so that a corresponding item can be highlighted in the alarm summary list, if the alarms are active. Hence, the system and method can allow an operator to see when alarms occur, their sequence, relations and priority, which aid the operators cope with inevitable alarm floods.

14 Claims, 6 Drawing Sheets

U.S. PATENT DOCUMENTS

| | | | |
|---|---|---|---|
| 2002/0099786 A1 | 7/2002 | Chun | |
| 2002/0186261 A1 | 12/2002 | Giles et al. | |
| 2005/0062598 A1 | 3/2005 | Akamatsu et al. | |
| 2005/0197806 A1 | 9/2005 | Eryurek et al. | |
| 2007/0211079 A1 | 9/2007 | Nixon et al. | |

FOREIGN PATENT DOCUMENTS

| | | | |
|---|---|---|---|
| EP | 0 906 629 B1 | | 2/2003 |
| GB | 2 275 564 A | | 8/1994 |
| GB | 2 372 365 A | | 8/2002 |
| GB | 2 395 831 A | | 6/2004 |
| GB | 2 412 449 A | | 9/2005 |
| GB | 2 419 723 A | | 5/2006 |
| GB | 2 426 355 A | | 11/2006 |
| WO | WO 2005/067403 A2 | | 7/2005 |
| WO | WO 2005/109126 A1 | | 11/2005 |
| WO | WO 2006/000110 A1 | | 1/2006 |
| WO | WO 2006/058090 A2 | | 6/2006 |

OTHER PUBLICATIONS

Brown, W. S. et al., *Advanced Alarm Systems: Revision of Guidance and Its Technical Basis* (2000) U.S. Nuclear Regulatory Commission, Washington, DC, NUREG/CR-6684.

Bullemer, P. et al., "Effective Operations Practices," *ASM Consortium Guidelines* (2007) Version 5.0.

Bullemer, P. et al., "Addressing alarm flood situations: Stage 1 operator interface design considerations," *ASM Consortium Technical Report* (2007) Version 1.02, Minneapolis, MN: Honeywell Laboratories.

Bullemer, P. et al., "Addressing Alarm Flood Situations: Stage 2 Experimental Design," *ASM Consortium Technical Report* (2007) Version 1.01, Minneapolis, MN: Honeywell Laboratories.

Errington, J. et al., "Effective Alarm Management Practices," *ASM Consortium Guidelines* (2007) Version 5.0.

Gordon, P. et al., "Alarm Presentation System (APS)" at Ringhals Nuclear Power Plant Unit 2.

Honeywell Experian Operator's Guide. EP-DSXX44. Release 300.

Kvalem, J. et al., "The Simulator-Based Halden Man-Machine Laboratory (HAMMLAB) and its Applications in Human Factor Studies," *OECD Halden Reactor Project*, Institute for Energy Technology, Norway.

Stanton, N. A. et al., "Alarm-initiated activities: an analysis of alarm handling by operators using text-based alarm systems in supervisory control systems," *Ergonomics* (1995) 38(11):2414-2431.

Tuszynski, J. et al., "A Pilot Project on Alarm Reduction and Presentation Based on Multilevel Flow Models," *Proceedings of the Enlarged Halden Programme Group Meeting, HPR-358* (2002) Storefjell, Gol, Norway.

PCT International Search Report dated May 28, 2010 for PCT Application PCT/US2009/067445.

* cited by examiner

FIG. 6

ALARM TREND SUMMARY DISPLAY SYSTEM AND METHOD

TECHNICAL FIELD

Embodiments are generally related to data-processing systems and methods. Embodiments also relate in general to the field of computers and similar technologies, and in particular to software utilized in this field. In addition, embodiments relate to alarm trend summary display systems and methods.

BACKGROUND OF THE INVENTION

Process control alarm systems are utilized in the area of factory automation and/or plants. A process control alarm system is employed in a distributed control system (DCS) of factories and/or plants. Within the plants, various manufacturing processes include machines and equipment, which can be constantly monitored by a number of process control alarms. Specifically, these process control alarms inform operators that a process has exceeded process control tolerance limits.

Today, a software interface, especially GUI (Graphical User Interface), is utilized to aid the operators in understanding the overall process control alarms and associated variables of one or more machines. Process control alarm variables are set and monitored through a GUI interface. In such alarm systems, operators can receive a large number of alarms within a short period of time, which is referred to as an "alarm flood." Alarm floods are the phenomenon of presenting more alarms in a given period of time than a human operator can effectively respond to. Such alarm floods are inherently difficult for operators to cope with and current systems so not support an operator in recognizing and dealing with abnormal or crisis situations that may result in numerous alarms.

In one known alarm management approach, alarm systems can create an alarm summary display to improve alarm system performance through improved alarm rationalization and alarm system maintenance practices. These efforts can have a considerable impact on reducing the likelihood of alarm flooding indications in an operator console through better alarm configuration and effective use of suppression techniques. However, even the alarm summary display does not effectively eliminate the occurrence of alarm flooding to assist operators.

The majority of prior alarm systems describe the visualization or design of a traditional alarm summary list of alarms in the DCS systems. These alarms summary lists pertain to how to configure or manage alarms, but they do not aid the operator to easily handle the alarm floods in the DCS systems. Such an alarm system is not sufficient to reduce alarm loads to a level that human operators can mentally process and physically respond to. Therefore, it is desirable to provide effective display design techniques to help operators cope with these inevitable alarm floods.

In an effort to address the foregoing difficulties, it is believed that a need exists for an improved alarm trend summary display system and method, which assists human operators in coping with alarm floods. It is believed that the improved system and method disclosed herein can address these and other continuing needs.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium related to alarm management.

It is another aspect of the present invention to provide for an improved alarm trend summary display system and method.

It is a further aspect of the present invention to provide for an alarm trend summary display utilized in the context of distributed control system (DCS) system.

The aforementioned aspects and other objectives and advantages can now be achieved as described herein. An improved alarm trend summary display system and method can utilize an alarm trend list that works together with an alarm summary list. A set of rows in the alarm trend list can be organized in a top-to-bottom manner. A set of alarm indicators within each row in the alarm trend list can be arranged in a right-to-left horizontal arrangement. The set of alarm indicators can be aligned with most recent alarms appearing on a right side of the alarm trend list. The specific alarm indicators can be selected in the alarm trend list, so that a corresponding item can be highlighted in the alarm summary list, if the alarms are active. Hence, the system and method can allow an operator to see when alarms occur, their sequence, relations and priority, which aid the operators in coping with inevitable alarm floods.

Furthermore, alarms can be shown via an icon, with new alarms shown at the far right side of the alarm trend list. The alarm indicators can move from right to left over time, where the alarm indicators on the left side of a line in the trend list are a historical representation whereas the alarm indicators on the right side are real-time representations. A tool tip field can display a complete alarm description including a complete tag name, when a mouse is moved/pointed over the alarm indicators in the alarm trend list. The tag name can be shown for the alarms in a real-time presentation area.

Additionally, the alarm trend list can include gray bands for each row, color choices and font style/size, which improves segregation of locations. The alarm trend list can also include an alarm type (e.g., Dev, LoLo, Lo, Hi, HiHi), which is respectively indicated, for the most recent alarms, as d, D, L, l, h and H embedded in an alarm priority symbol. The alarm trend list can display a qualitative alarm state of a parameter of the alarms over time. A set of qualitative trend arrows on the far right side can indicate a qualitative direction of the parameter that last alarmed in the row of the alarm trend list.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 6 illustrates a screen display of an alternative user interface, in accordance with a preferred embodiment.

DETAILED DESCRIPTION

The particular values and configurations discussed in these non-limiting examples can be varied and are cited merely to illustrate at least one embodiment and are not intended to limit the scope of such embodiments.

Figure 1:
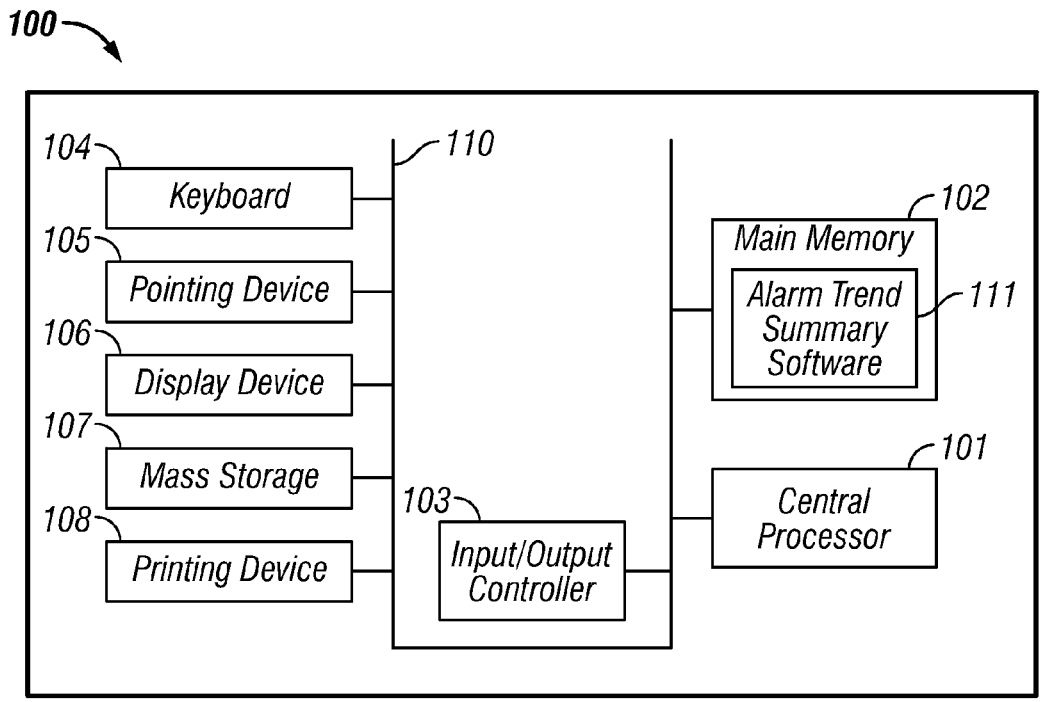
FIG. 1 illustrates a schematic view of a computer system in which the present invention can be embodied.
Figure 2:
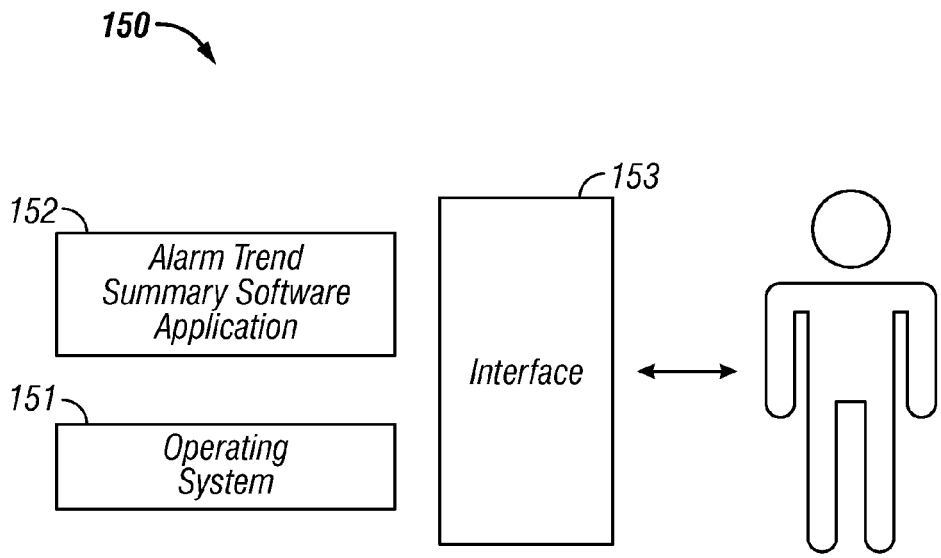
FIG. 2 illustrates a schematic view of a software system including an operating system, application software, and a user interface for carrying out the present invention.
Figure 3:
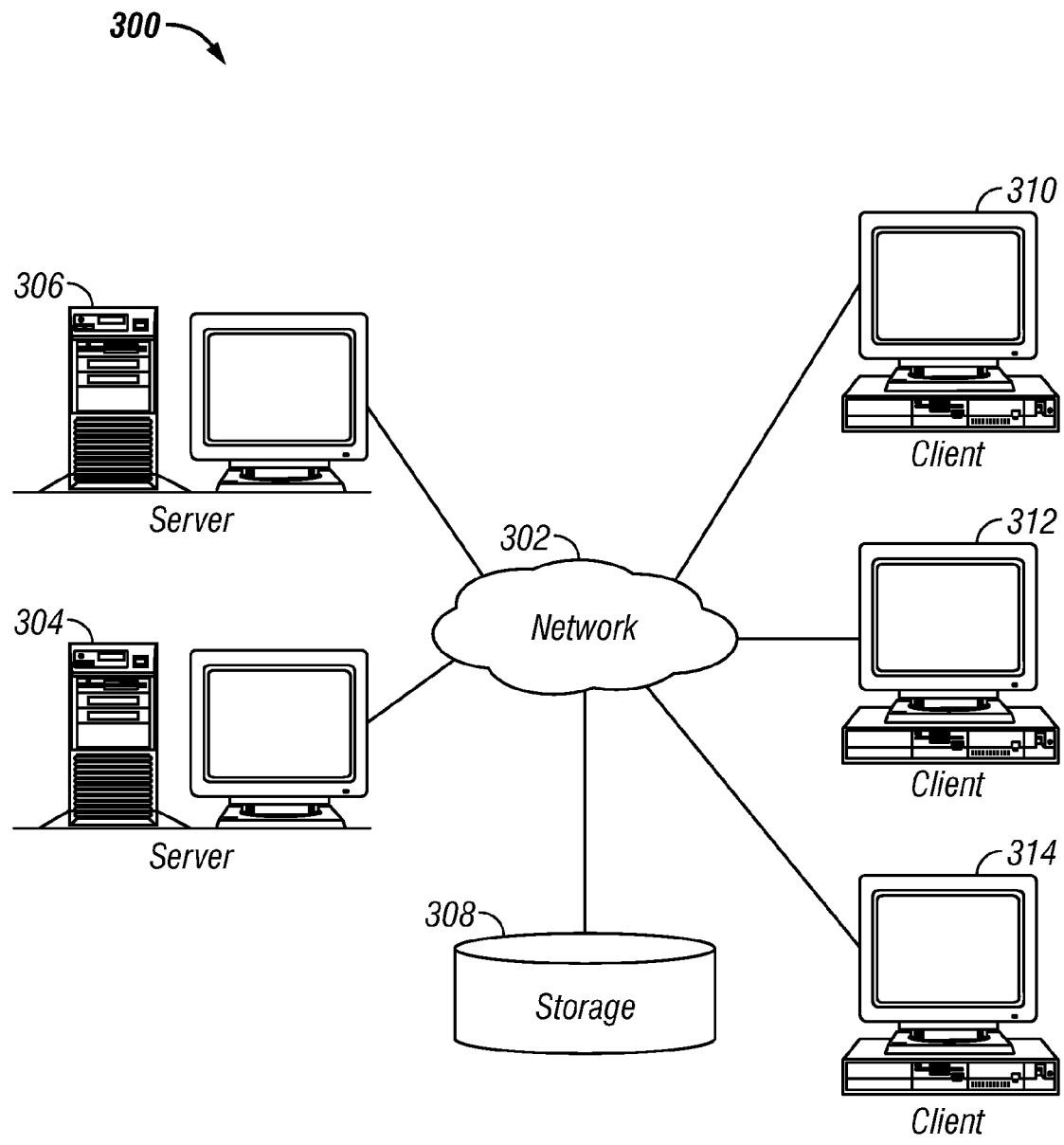
FIG. 3 depicts a graphical representation of a network of data processing systems in which aspects of the present invention can be implemented.

FIGS. 1-3 are provided as exemplary diagrams of data processing environments in which embodiments of the present invention can be implemented. It should be appreciated that the configurations depicted in FIGS. 1-3 are only exemplary and are not intended to assert or imply any limitation with regard to the environments in which aspects or embodiments of the present invention can be implemented. Many modifications to the depicted environments can be made without departing from the spirit and scope of the present invention.

As depicted in FIG. 1, the present invention can be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, can be included in the data-processing apparatus 100 as desired. As illustrated, the various components of the data-processing apparatus 100 communicate through a system bus 110 or similar architecture. Alarm trend summary programming software 111 can be stored in the main memory 102 and executed by the central processor 101. Data-processing apparatus 100 can include a server or a group of interconnected servers, depending upon design considerations. For example, data-processing apparatus 100 can include servers, such as, for example, servers 304 and 306 depicted in FIG. 3.

Illustrated in FIG. 2, a computer software system 150 is provided for directing the operation of the data-processing apparatus 100 of FIG. 1. Software system 150, which is stored in system memory 102 and on disk memory 107, generally includes a kernel or operating system 151 and a shell or interface 153. One or more application programs, including the alarm trend summary programming, such as alarm trend summary application software 152, can be "loaded" (i.e., transferred from storage 107 into memory 102) for execution by the data-processing apparatus 100. The data-processing apparatus 100 receives user commands and data through user interface 153; these inputs can then be acted upon by the data-processing apparatus 100 in accordance with instructions from operating module 151 and/or application module 152.

The interface 153, which is preferably implemented as a graphical user interface (GUI), also serves to display results, whereupon the user may supply additional inputs or terminate the session. In some embodiments, operating system 151 and interface 153 can be implemented in the context of a Windows®-based system or another appropriate computer operating system. Window® is a registered trademark of Microsoft Corporation. Application module 152, on the other hand, can include instructions, such as the various operations described herein with respect to the various components and modules described herein, such as, for example, the method 600 depicted in FIG. 6.

FIG. 3 depicts a graphical representation of a network of data processing systems 300 in which aspects of the present invention may be implemented. Network data processing system 300 is a network of computers in which embodiments of the present invention may be implemented. Note that the system 300 can be implemented in the context of a software module such as application software 152 with alarm trend summary programming. The system 300 includes a network 302 in communication with one or more clients 310, 312, and 314. Network 302 is the medium used to provide communications links between various devices and computers connected together within network data processing apparatus 100. Network 302 may include connections, such as wire, wireless communication links, or fiber optic cables. Network 302 can further communicate with one or more servers 304 and 306 and a memory storage unit, such as, for example, memory or database 308.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers, which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

Figure 4:
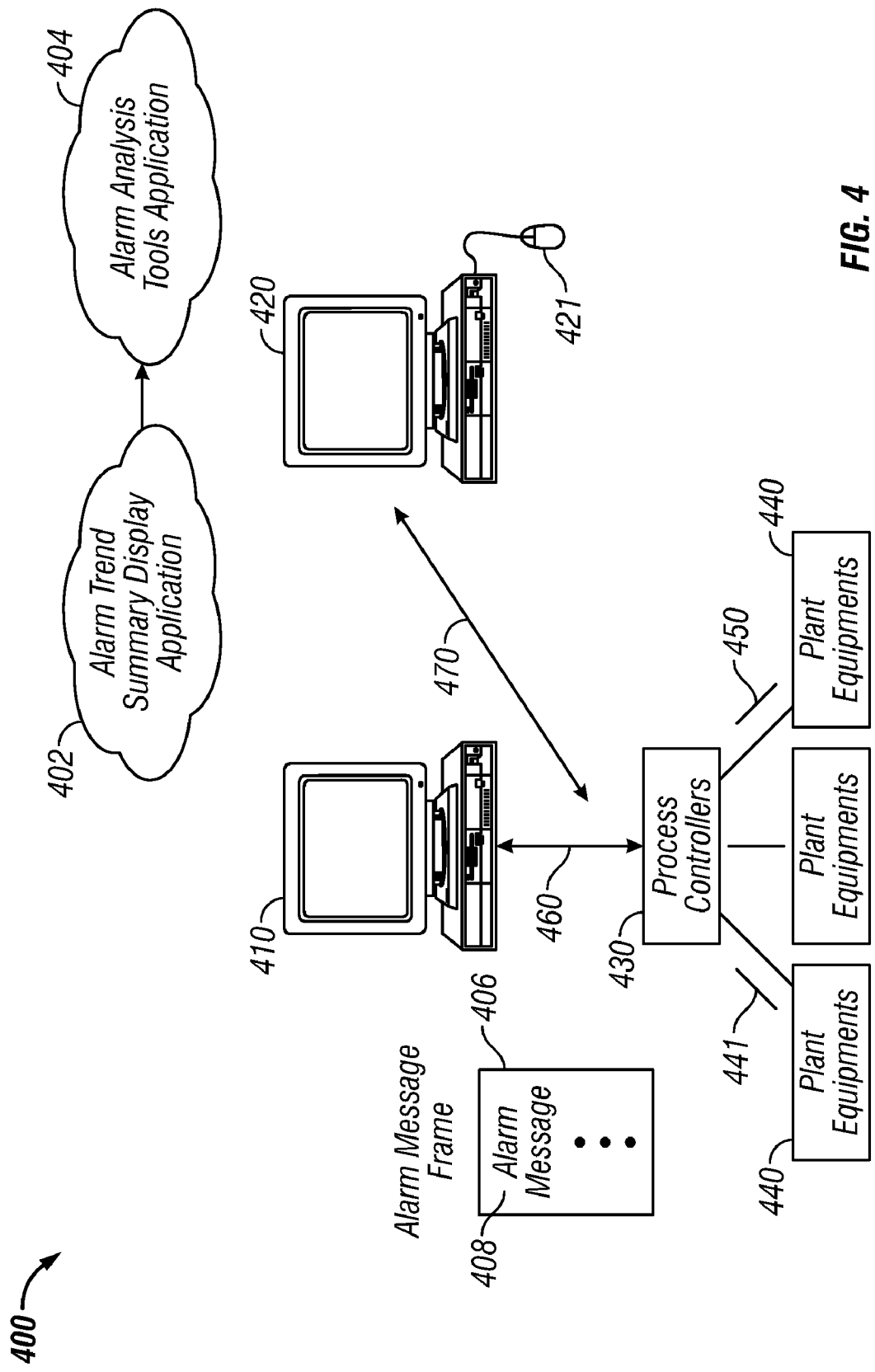
FIG. 4 illustrates a schematic overview of a computer network environment in which the present invention can be deployed.

FIG. 4 illustrates a schematic overview of a computer network environment 400 in which the present invention is deployed. The computer network environment 400 can briefly comprise an alarm system host computer 410 and an alarm auxiliary computer 420 with an alarm trend summary display application 402. The alarm system host computer 410 can communicate to a set of process controllers 430 via an alarm system host computer data communication link 460. The alarm analysis tools auxiliary computer 420 can tap into the alarm system host computer data communication link 460 via an alarm analysis tools auxiliary computer data communication link 470. In the preferred embodiment of the present invention, the alarm analysis tools auxiliary computer 420 can include I/O (input/output) accessories, such as a computer mouse 421. Other cursor control devices and input means (e.g. keyboards and the like) are also suitable to the alarm analysis tools auxiliary computer 420.

The alarm system host computer 410 can receive an alarm message frame 406, which is issued by the process controllers 430 to the alarm system host computer 410 via the alarm system host computer data communication link 460. The alarm analysis tools auxiliary computer 420 can simultaneously receive the alarm message frame 406 via the alarm analysis tools auxiliary computer data communication link 470. The received alarm message frame 406 can be processed by an alarm analysis tools application 404, which resides on the alarm analysis tools auxiliary computer 420. The alarm analysis tools application 404 can be preconfigured and display a set of alarm messages 408 in accordance with information provided by the alarm trend summary display application 402.

The alarm message frame 406 can be generated by the process controllers 430 in response to alarm signals 441 received from a set of plant equipments 440 via process controller links 450. The alarm signals 441 can be issued from the plant equipments 440 due to an out-of-range detection, failure detection or a malfunction of the plant equipments 440. The alarm messages 408 can be transferred in the alarm message frame 406 in response to the process controllers 430. Such alarm messages 408 can be determined, organized and categorized into an alarm trend list 502 and an alarm summary list 504, as illustrated in FIG. 5, by the alarm trend summary display application 402.

Figure 5:
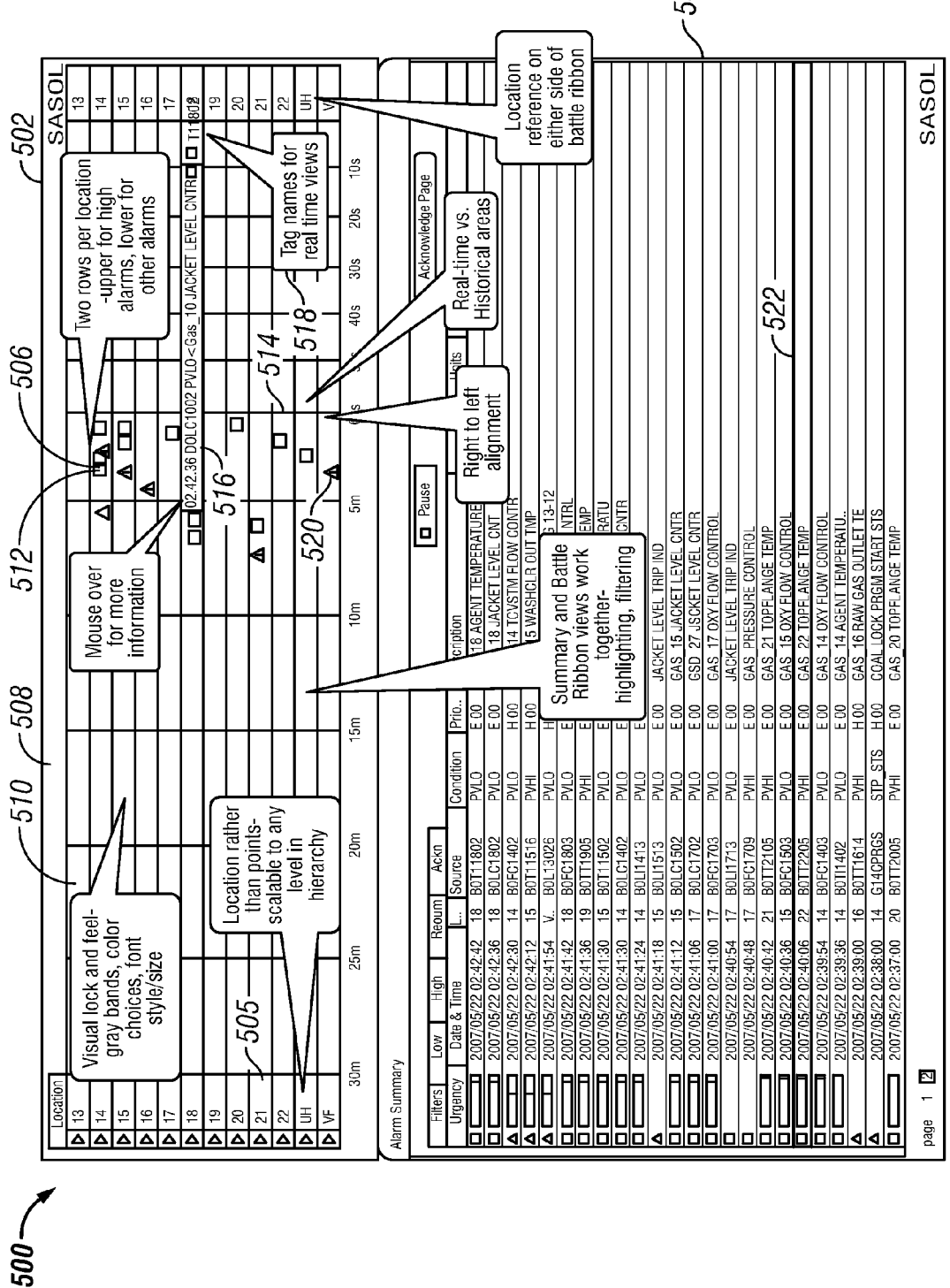
FIG. 5 illustrates a screen display of an application window of an alarm trend summary display application, in accordance with a preferred embodiment.

FIG. 5 illustrates a screen shot revealing an application window 500 of an alarm trend summary display application 402, in accordance with a preferred embodiment. Application window 500 can be implemented utilizing a GUI as described above and provided by a software module such as, for example, module 152 illustrated in FIG. 3. The alarm trend summary display application 402 can display a qualitative state of a parameter of the alarm messages 408, i.e. alarms 506, over time. FIG. 5 shows the alarm trend summary concept for equipment areas 505 (locations) in a typical site. The specific equipment area 505 in an alarm row 508 can focus and/or filter contents 522 of the alarm summary list 504 on alarms 506 for the specified location 505. The alarm trend summary display application 402 can be scalable to any level of the equipment hierarchy in the plant. The application window 500 of the alarm trend summary display application 402 can include an alarm trend list 502 that works in conjunction with an alarm summary list 504 in the distributed control system (DCS) system 400 with highlighting and filtering functions to help the operator focus. Note that in FIGS. 1-6 identical parts or elements are generally indicated by identical reference numerals.

In the alarm trend list 502, the alarms 506 can be arranged in rows 508 and organized in a logical way. The alarms 506 can be shown via an icon, with new alarms 506 showing in the far right side of the alarm trend list 502. Each row 508 in the alarm trend list 502 can include a set of alarm indicators 512 that move from right to left over time. The alarm indicators 512 on the left side of a black line 514 in the trend list 502 are a historical representation whereas the alarm indicators 512 on the right side are real-time representations. The selection of the specific alarm indicator 512 in the alarm trend list 502 can result in a corresponding alarm description item 522 shown as selected in the alarm summary list 504, if the alarm 506 is still active.

Moreover, a tool tip field 516 can display a complete alarm description including a complete tag name 518, when a mouse 421 (as illustrated in FIG. 4) is pointed over the alarm indicators 512 in the alarm trend list 502. The tag name 518 can be shown for the alarms 506 in a real-time presentation area, and include additional information, such as current point value, deviation from set point, etc. The alarm trend list 502 can include gray bands 510 for each row 508, color choices and font style/size, which improves segregation of the locations 505. The alarm trend list 502 can also include an alarm type 520 (e.g., Dev, LoLo, Lo, Hi, HiHi), which is respectively indicated, for the most recent alarms 506, as d, D, L, l, h and H embedded in an alarm priority symbol. A set of qualitative trend arrows (not shown) on the far right side can indicate a qualitative direction of the parameter that last alarmed in the row 508 of the alarm trend list 502.

Figure 6:
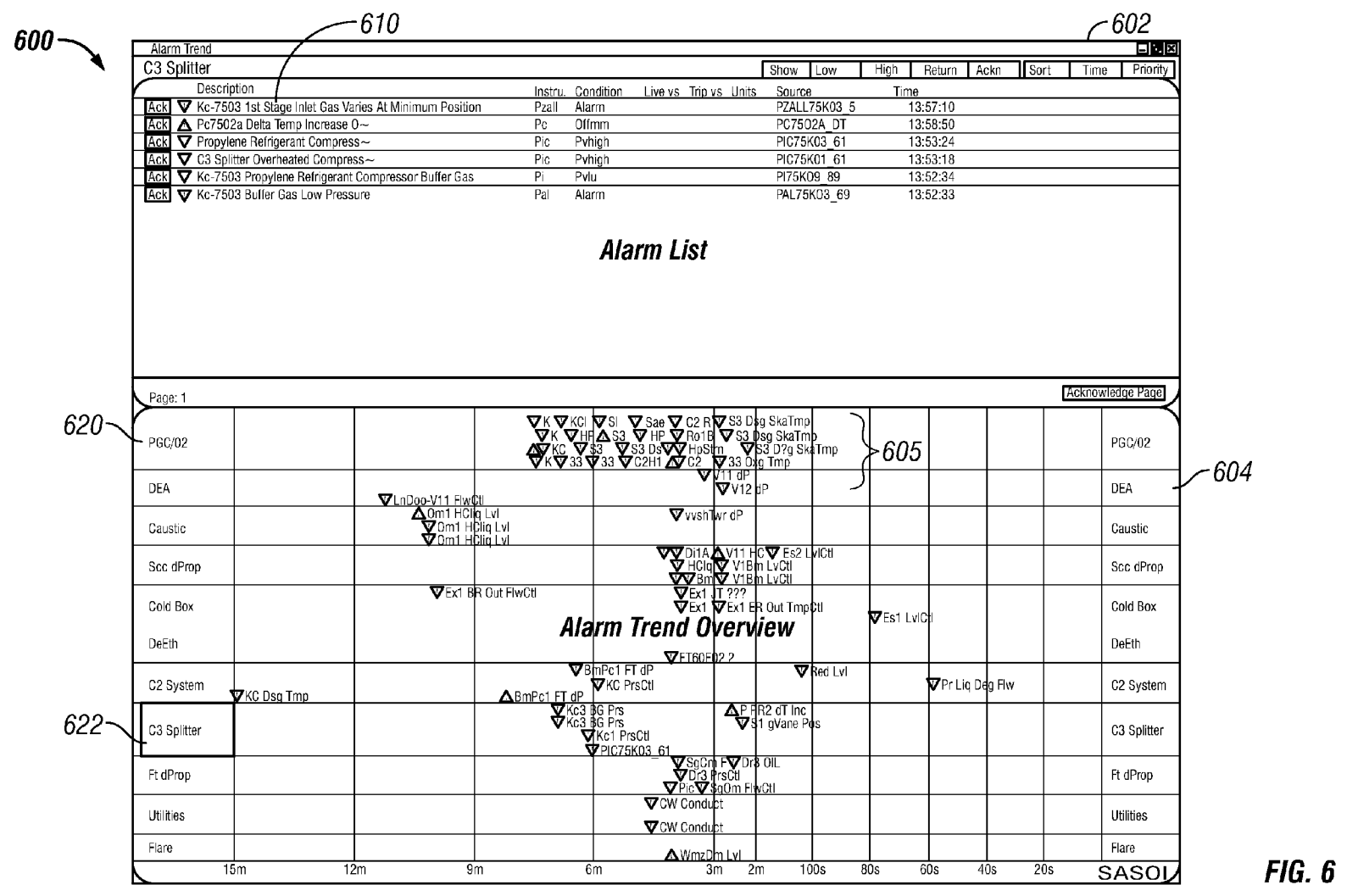

Referring to FIG. 6, a screen shot 600 of an alternate presentation of an alarm trend summary display is illustrated. The display 600 provides an overview of alarms by equipment area by showing the time-based order of the alarms. The Alarm Trend display 600 as shown includes s two main portions: the Alarm Trend Overview 602 and the Alarm List 604. The alarm trend overview 602 contains an alarm timeline for each major equipment area, e.g., C3 Splitter 622. Each alarm is represented by an icon that indicates alarm priority—e.g., emergency, high, or low priority—as well as alarm type—e.g., Low Limit, High Limit, BadPV, and so on. In addition, each alarm can be represented by a short descriptor. With a mouse-over, an operator can obtain details of an alarm as well as long descriptions. Furthermore, several rows of descriptors can be shown for a relevant price of equipment. For example, the PGC/O2 equipment has four rows 605 listed. The alarm list pane 604 can be provided in the form of a traditional alarm list 610 as shown, but can be re-organized for easier reading, where the newest alarm is listed at the top, by default, and alarms move down in the list as other newer alarms enter.

By observing the display, an operator can easily find the most critical process conditions in the Equipment Rows in the Alarm Trend window. Use the icons, which indicate: alarm priority—either low, high, or urgent priority; the type of alarm—like a Lo-Lo limit exceedance, Hi-Hi exceedance, BadPV, etc.; the alarm status—whether it is Active, Unacknowledged (full color & flashing), Active, Acknowledged (half-color & not flashing), or Active, Return-to-Normal (white color and flashing). An operator can identify the most critical alarm condition by looking at one or more of the following: the highest priority, unacknowledged alarm (still flashing); the equipment area with the most unacknowledged alarms, and the most critical equipment area with an unacknowledged alarm. Short descriptors should also help you identify the most critical alarm(s).

After identifying the most critical alarm condition, an operator can look at the alarm or pattern of alarms for that equipment area to determine what actions should be taken by observing the pattern of alarms, by looking at the Alarm Trend window and the icons and short descriptors associated with the critical alarm condition. If more information is needed than the icons and short descriptors, an operator can mouse-over on the critical alarm or group of alarms get a pop-up menu that has long descriptions that are normally obtainable in the alarm list. When there is a group or burst of alarms, an operator should normally not respond to single alarms, but instead can look for the pattern of alarms if there is more than one alarm and respond to the underlying process condition generating the group of alarms. Alternatively, an operator can focus the alarm list on the equipment area that has the critical alarm condition, by clicking in that equipment area in the Alarm Trend window. While taking the control actions, an operator can keep monitoring the summary information to make sure other more critical alarms have not come in for another equipment area. If a more critical alarm condition arises in another equipment area, an operator can repeat the alarm response strategy for that more critical alarm condition. After completing the required control actions, acknowledge the alarm or alarms that an operator just dealt with. It is important to acknowledge alarms after an operator have taken the appropriate control actions, so that you can keep up with alarms more easily during alarm flood situations. To acknowledge a group of alarms for that equipment area, an operator can do a mouse-over and right-click, which gives you the "Acknowledge Cluster" button in the pop-up text box. By clicking the "Acknowledge Cluster" button in the pop-up text box the system can acknowledge all the alarms in the pop-up box. If that equipment area is in the Alarm List, an operator can click on the "Acknowledge Page" button below the Alarm List. To acknowledge one alarm, an operator can focus the alarm list on a specific Equipment Area by clicking in that equipment area in the Alarm Trend view, then click the "Ack" button in the row of the one alarm that you want to acknowledge. After acknowledging the alarm or alarms in the alarm condition that an operator had taken appropriate control actions for, an operator can return to the summary information in the new summary displays, and repeat the overall alarm response strategy.

Figure 7:
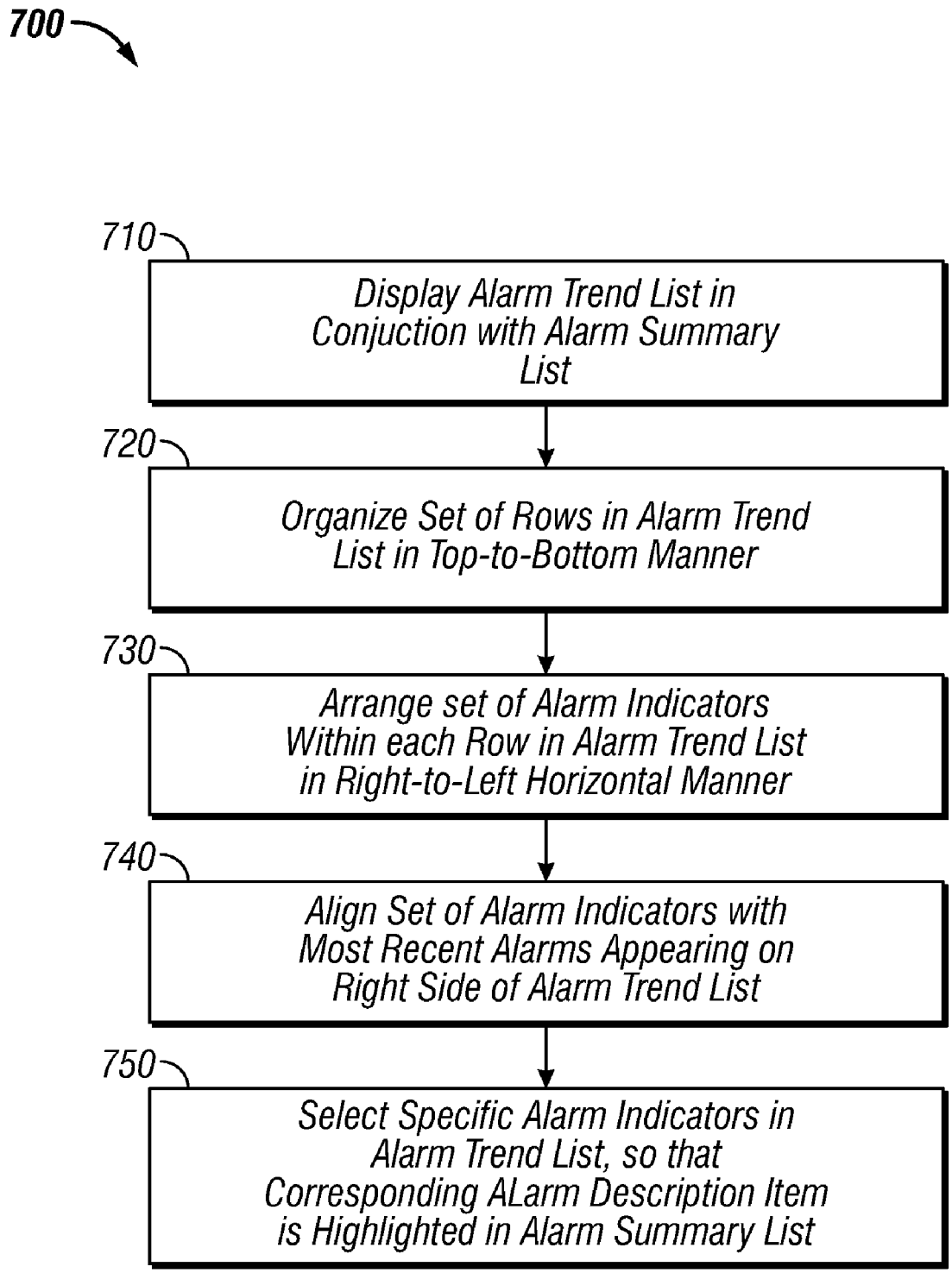
FIG. 7 illustrates a flow chart of an alarm trend summary display method utilizing the alarm trend summary display application, in accordance with a preferred embodiment.

FIG. 7 illustrates a flow chart of operations depicting an alarm trend summary display method 700 utilizing the alarm trend summary display application 402, in accordance with a preferred embodiment. Note that the method 700 can be implemented in the context of a computer-useable medium that contains a program product. The method 700 depicted in FIG. 7 can also be implemented in a computer-usable medium containing a program product. As illustrated at block 710, an alarm trend list 502 can be operated in conjunction with an alarm summary list 504 with highlighting and filtering functions to help the operator focus. As indicated at block 720, a set of rows 508 in the alarm trend list 502 can be organized in a top-to-bottom manner. Each row 508 can include gray bands 510, color choices and font style/size for visual look and feel. The alarm trend list 502 can contain two or three rows 508 per location 505, which allows better organization of alarms 506 such as using an upper row 508 for high priority alarms 506, lower row 508 for medium priority alarms 506 and low priority alarms 506, if alarm rates permit via a throttling algorithm.

The organized row 508 in the alarm trend list 502 can intuitively reflect a plant process flow or geographical arrangement, and can be spaced for up to ten equipment areas 505. As depicted at block 730, a set of alarm indicators 512 within each row 508 in the alarm trend list 502 can be arranged in a right-to-left horizontal manner of arrangement. A horizontal scroll on the bottom of the alarm trend list 502 can enable moving backward and forward in time for the historical portion of the alarm trend 506, i.e. minutes. The alarm trend list 502 can provide an ability to manipulate the time scale for the alarms 506, including zoom in/out functions, fields to define range of interest and pre-set time frames.

As displayed at block 740, the set of alarm indicators 512 can be aligned with most recent alarms 506 appearing on a right side of the alarm trend list 502. The alarms 506 can be organized logically by location such as shift, equipment area, plant or site, rather than by points, so that the alarms 506 are scalable to any level in equipment hierarchy. As illustrated at block 750, the specific alarm indicators 512 can be selected in the alarm trend list 502, so that a corresponding alarm description item 522 can be highlighted in the alarm summary list 504, if the alarms 506 are active. Hence, the method 700 can allow an operator to see when alarms 506 occur, their sequence, relations and priority, which aid the operators cope with inevitable alarm floods.

The respective methods and/or models described herein with respect to FIGS. 1-7 can be implemented in the context of a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. For example, system 300 may represent a network such as the "Internet", depending upon design considerations.

It should be understood, therefore, that such signal-bearing media when carrying or encoding computer readable instructions that direct method functions in the present invention, represent alternative embodiments of the present invention. Further, it is understood that the present invention can be implemented by a system having means in the form of hardware, software, or a combination of software and hardware as described herein or their equivalent. Thus, the methods and modules described herein with respect to FIGS. 1-7 can be deployed as process software in the context of a computer system or data-processing system as that depicted in FIGS. 1-3 herein, or other data-processing devices, networks and systems.

While the present invention has been particularly shown and described with reference to a preferred embodiment, it will be understood by those skilled in the art that various changes in form and detail can be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A prioritized alarm trend summary display method operating on a computer, comprising:
graphically displaying a prioritized alarm trend list in conjunction with a prioritized alarm summary list with a plurality of highlighting and filtering functions, and organizing a plurality of rows in said prioritized alarm trend list in a top-to-bottom manner;
prioritizing a plurality of alarm indicators over time within said plurality of rows in said prioritized alarm trend list in a right-to-left horizontal arrangement with qualitative trend arrows indicating a qualitative direction of a parameter that last alarmed in said plurality of rows in said alarm trend list
aligning said plurality of prioritized alarm indicators with a most recent real-time alarm appearing on a right side of said prioritized alarm trend list and a historical representation of said plurality of alarm indicators appearing on a left side of said prioritized alarm trend list, said plurality of prioritized alarm indicators organized logically by location so that said plurality of prioritized alarm indicators are scalable to any level in equipment hierarchy; and
selecting at least one of said plurality of prioritized alarm indicators in said prioritized alarm trend list, so that a corresponding alarm description item is highlighted and displayed in said alarm summary list, if said alarm is active, thereby allowing an operator to see when said alarm occur, their sequence, relation and priority, which helps said operator cope with an inevitable alarm flood.

2. The method of claim 1 further comprising:
displaying a complete alarm description with a tag name in a tool tip field in said alarm trend list, when a mouse is pointed over said plurality of alarm indicators in said alarm trend list.

3. The method of claim 1 wherein said plurality of rows comprises a gray band, a color choice and a font style/size.

4. The method of claim 1 wherein said alarm trend list comprises at least two or three rows per location.

5. The method of claim 1 wherein said plurality of alarm indicators on a left side of a black line in said alarm trend list is a historical representation and on a right side of said black line in said alarm trend list is a real-time representation.

6. The method of claim 1 wherein said tag name comprises a current point value and a deviation from set point.

7. The method of claim 1 wherein said alarm trend list also comprises an alarm type that is embedded in an alarm priority symbol.

8. A prioritized alarm trend summary display method operating on a computer, comprising:
graphically displaying a prioritized alarm trend list in conjunction with a prioritized alarm summary list with a plurality of highlighting and filtering functions, and organizing a plurality of rows in said prioritized alarm trend list in a top-to-bottom manner;
prioritizing a plurality of alarm indicators over time within said plurality of rows in said prioritized alarm trend list in a right-to-left horizontal arrangement with qualitative trend arrows indicating a qualitative direction of a parameter that last alarmed in said plurality of rows in said alarm trend list
aligning said plurality of prioritized alarm indicators with a most recent real-time alarm appearing on a right side of said prioritized alarm trend list and a historical representation of said plurality of prioritized alarm indicators appearing on a left side of said prioritized alarm trend list, said plurality of prioritized alarm indicators organized logically by location so that said plurality of prioritized alarm indicators are scalable to any level in equipment hierarchy;
displaying a complete alarm description with a tag name in a tool tip field in said alarm trend list, when a mouse is pointed over said plurality of alarm indicators in said alarm trend list; and
selecting at least one of said plurality of alarm indicators in said alarm trend list, so that a corresponding alarm description item is highlighted and displayed in said alarm summary list, if said alarm is active, thereby allowing an operator to see when said alarm occur, their sequence, relation and priority, which helps said operator cope with an inevitable alarm flood.

9. The method of claim 8 wherein said plurality of rows comprises a gray band, a color choice and a font style/size.

10. The method of claim 8 wherein said alarm trend list comprises at least two or three rows per location.

11. The method of claim 8 wherein said plurality of alarm indicators on a left side of a black line in said alarm trend list is a historical representation and on a right side of said black line in said alarm trend list is a real-time representation.

12. The method of claim 1 wherein said tag name comprises a current point value and a deviation from set point.

13. The method of claim 1 wherein said alarm trend list also comprises an alarm type that is embedded in an alarm priority symbol.

14. A alarm monitoring system including a prioritized trend summary display, comprising:
a computer;
a graphical display connected to said computer and configured to graphically displaying a prioritized alarm trend list in conjunction with a prioritized alarm summary list with a plurality of highlighting and filtering functions, and organizing a plurality of rows in said prioritized alarm trend list in a top-to-bottom manner;
an alarm trend summary software operating within said computer and configured to prioritize a plurality of alarm indicators over time within said plurality of rows in said alarm trend list in a right-to-left horizontal arrangement with qualitative trend arrows indicating a qualitative direction of a parameter that last alarmed in said plurality of rows in said prioritized alarm trend list
aligning said plurality of prioritized alarm indicators with a most recent real-time alarm appearing on a right side of said alarm trend list and a historical representation of said plurality of prioritized alarm indicators appearing on a left side of said alarm trend list, said plurality of prioritized alarm indicators organized logically by location so that said plurality of prioritized alarm indicators are scalable to any level in equipment hierarchy;
a display connected to said computer and configured to displaying a complete alarm description with a tag name in a tool tip field in said alarm trend list, when a mouse is pointed over said plurality of alarm indicators in said prioritized alarm trend list; and
a user interface configured to enable a user to select at least one of said plurality of prioritized alarm indicators in said alarm trend list, so that a corresponding alarm description item is highlighted and displayed in said prioritized alarm summary list, if said alarm is active, thereby allowing an operator to see when said alarm occur, their sequence, relation and priority, which helps said operator cope with an inevitable alarm flood.

* * * * *